United States Patent [19]

Hansen

[11] Patent Number: 5,499,120
[45] Date of Patent: Mar. 12, 1996

[54] LIQUID CRYSTAL DEVICE HAVING LEDS OF A WIDE POLAR LIGHTING ANGLE, THE POLAR ANGLE DETERMINING THE LEDS SPACING

[75] Inventor: Ingolf G. Hansen, Tollose, Denmark

[73] Assignee: Motorola, Inc., Schaumburg, Ill.

[21] Appl. No.: 362,587

[22] PCT Filed: Jun. 3, 1993

[86] PCT No.: PCT/EP93/01398

§ 371 Date: Dec. 22, 1994

§ 102(e) Date: Dec. 22, 1994

[87] PCT Pub. No.: WO94/00793

PCT Pub. Date: Jan. 6, 1994

[30] Foreign Application Priority Data

Jun. 26, 1992 [GB] United Kingdom .................. 9213646

[51] Int. Cl.$^6$ ................................................ G02F 1/1335
[52] U.S. Cl. ................................................ 359/48; 359/49
[58] Field of Search .................................. 359/48, 83, 49, 359/50

[56] References Cited

FOREIGN PATENT DOCUMENTS

0363700A2  4/1990  European Pat. Off. .

OTHER PUBLICATIONS

Apgar, W. D., Western Electric "Back Lighting Liquid Crystal Displays with Light–Emitting Diodes," *Technical Digest* No. 67, Jul. 1982.

Waitl, G., Schellhorn, R., "Background Illumination with LEDs, " 17 Sep., No. 1.

Nagata, M., Wada, H., "Neutralized Supertwisted Nematif LCD: Principle and Characteristics," *The Transactions of the IEICE*, vol. E 71, No. 11, Nov. 1988.

Sakae, Japanese Patent Abstract, JP 1105216, Apr. 1989.

Tsumtomu, Japanese Patent Abstract JP 62210428, Sep. 1987.

*Primary Examiner*—Anita Pellman Gross
*Assistant Examiner*—Toan Ton
*Attorney, Agent, or Firm*—Daniel K. Nichols; Frank M. Scutch, III

[57] ABSTRACT

A display is provided comprising a semi-transparent display element (16, 17, 18, 19), such as double super twisted nematic (DSTN) liquid crystal display (LCD) cell, a sub-assembly having backlight elements (11, 12, 13) mounted thereon, and mounting means (20) mounting the display element over the sub-assembly with the display element adjacent to the back light elements, with no diffuser between the backlight elements and the display element. The backlight elements are an array of light emitting diodes of sufficiently wide angle and spaced sufficiently close together that, when viewed from the front of the display element, the display has substantially evenly dispersed brightness across the array.

19 Claims, 1 Drawing Sheet

LIQUID CRYSTAL DEVICE HAVING LEDS OF A WIDE POLAR LIGHTING ANGLE, THE POLAR ANGLE DETERMINING THE LEDS SPACING

FIELD OF THE INVENTION

This invention relates to semi-transparent displays, such as liquid crystal displays (LCDs).

BACKGROUND OF THE INVENTION

Solid state displays are finding wider and wider applications in the electronics and consumer industries. Liquid crystal displays have largely superseded earlier light emitting diode displays, on account of factors such as low current drain, reliability, readability and aesthetic appearance.

LCDs operate in either reflective mode, transmissive mode or transflective mode. A reflective mode LCD requires ambient light to be reflected from the display to show the contrasting segments. A transmissive mode LCD has a backlight and passes the light through the display. A transflective mode LCD has a low backlight and a thin reflective layer in the back polarizer. Transflective mode LCDs are usable in all conditions of ambient light. The ruggedness of such devices is in part dependent on the reliability of the backlights.

Positive transmissive or Transflective mode LCDs are displays in which the characters appear dark in contrast to a light background. Negative transmissive or transflective mode LCDs allow light to pass through the characters and block the passage of light through the background.

LCDs are made from a sandwich of two layers of cell with polarizable liquid between them. The liquid selectively rotates the light passing through. Front and back polarizers polarize the light and filter out light that has been rotated by the liquid, or has not been rotated, depending on the transmissive mode of the display. The cell sandwich is typically known as twisted neumatic cell and typically rotates the light through 180°. Super twisted nematic cell is similar but has a liquid that imparts about 270° rotation. Double super twisted nematic (DSTN) cell is a double sandwich of super twisted nematic cell where the extra sandwich is a compensation cell and gives a wider viewing angle. Normal super twisted nematic displays read to change colour with temperature. In a DSTN display, the compensation cell also gives colour compensation. DSTN displays are neutral regarding colour.

It is known to provide negative transmission mode LCD displays using DSTN cell with a cold cathode tube to provide the backlighting, generally provided via a light pipe from outside the display. Such an arrangement is only possible in such applications as aviation displays where there is adequate room for the bulky cold cathode tube and the light pipe. Cold cathode tubes are not suitable for mobile radios because of the need for a high voltage transformer, shielding and because of r.f. noise generated. A further problem with cold cathode tubes is that they cannot start below about −10° C. This is acceptable in aircraft cockpits and some motor vehicle dashboards, but is not acceptable for radios which need to be operated outdoors. Ordinary filament bulbs can be used, but these have a very short lifetime.

It is also known, for transflective mode LCDs, to provide a module of LEDs to provide backlighting. Such a module comprises an array of chip LEDs mounted on a printed circuit board (PCB) and covered by a diffuser. The diffuser diffuses the light from the array of LEDs and provides uniform distribution of light across the module. The diffuser reduces the light from the LEDs by about 20%. A problem when attempting to use a module of LEDs and a diffuser as a backlight for a transmission mode LCD is that the overall display has a very thick profile. This is unacceptable in many applications, creating the same problem as the cold cathode tube arrangement.

Elektronik vol. 40 no. 19 September 1991 pages 96–99 G. Waitl et al confirms that ready-made modules are relatively inflexible for these purposes and proposes discrete "Argus" LEDs or 3 mm nondiffuse LEDs with light boxes or fine light guides. The LEDs are through-mounted into the underlying printed circuit board or other mounting. Each light box has a reflector surrounding the LED and covered by a diffusing screen. The heights of the reflectors are 9.5–17 mm to which must be added the thickness of the diffusing screen to give the minimum thickness of the backlight array. Different possibilities for rear illumination of liquid crystal displays are also shown with a transfusor between the backlight illumination source and the LCD cell.

EP-A-0363700 shows a one-dimensional row of through-mounted LEDs mounted in an elongate box having reflective areas which extend at an angle to collect the light in such a way as to uniformly illuminate a positive transmissive mode LCD display.

Technical Digest—Western Electric no. 67, July 1982 pages 1–2 shows a LCD module having a display element and a backlight sub-assembly where the display element is mounted over and directly adjacent to the backlight sub-assembly and the backlight sub-assembly comprises an array of LEDs mounted on a circuit board. Each LED has an epoxy dome to "increase the light-emitting efficiency". The modular construction makes the design inflexible. The circuit board of the module must be mounted on another circuit board for connection to other operative elements of the product of which the module forms a part, This gives a high overall thickness and does not facilitate good heat dissipation.

There is currently no low-profile display that meets all the customer requirements of viewing angle, character definition, temperature range, durability, operating life and aesthetic appearance (including colour stability).

There is a need for an improved low profile display.

SUMMARY OF THE INVENTION

According to the present invention, a display is provided comprising: a semi-transparent display element; a backlight sub-assembly, and mounting means mounting the display element over and directly adjacent to the backlight sub-assembly, wherein the backlight sub-assembly comprises a 2-dimensional array of light emitting diodes mounted on a circuit board, characterised in that: there is no diffuser between the light emitting diodes and the display element, the light emitting diodes have a wide polar lighting angle, and the spacing between the light emitting diodes is determined in relation to the polar lighting angle such that overlapping of light from one light emitting diode to another provides the display, when viewed from the front of the display element, with substantially evenly dispersed brightness across the array.

It is preferred that the semi-transparent display element is a transmissive or transflective mode liquid crystal assembly having a front polarizer, a back polarizer and a display cell element and a compensation cell element sandwiched between the front and back polarizers.

In another aspect of the invention, a display according to claim 6 is provided.

The inventor has discovered that a display cell element of double super twisted nematic (DSTN) cell give a degree of diffusion in the cell and thereby obviates the need for a diffuser. This substantially reduces the profile of the display. It is therefore preferred that the display cell element and compensation cell element arc of DSTN cell.

The LCD is preferably negative transmission mode.

It is a further significant problem that an array of LEDs generates a substantial amount of heat. Moreover, a semi-transparent display element such as DSTN cell absorbs light from the LEDs. This has the effect of heating the LCD glass outside its specified range and if not dissipated, harms glue joints used for assembly of the front and back polarizers. The problem is made worse by the proximity of the LEDs to the display element.

It has been found that if the LED devices are directly mounted on copper conductive strips of a PCB, rather than through using a module of LEDs, the two-fold advantages of good heat conduction through the LED leads to the PCB mad low overall profile are achieved.

The LEDs are preferably surface-mounted on the PCB.

It has been mentioned that DSTN glass is the preferred material for the LCD display. Other glasses may be available, but it is preferred that glass having fifty percent, and more preferably eighty percent light reduction (measured through the display) is used. Some of the non-transmitted light is diffused in the glass and contributes to the uniform brightness.

The surface of the PCB may be lightly coloured or silvered, but is most preferably white (e.g. paper white) so as to reflect as much as possible of the light from the LEDs within the space between the PCB and the LCD backplane. Preferably still, all the surfaces behind and around the LEDs are substantially white.

Instead of white surfaces, the surface of the PCB and/or the other surfaces around the LEDs may be selected to reflect the colour of light of the selected LEDs.

BRIEF DESCRIPTION OF THE DRAWINGS

A preferred embodiment of the invention is described, by way of example, with reference to the drawings, in which.

DETAILED DESCRIPTION OF THE PREFERRED EMBODIMENT

Figure 1:
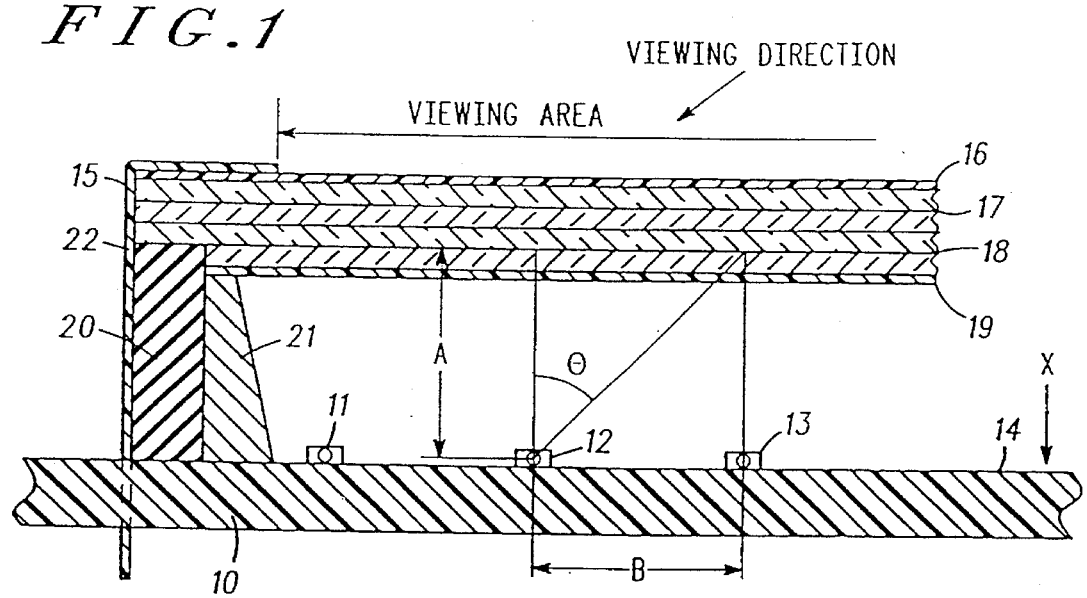
FIG. 1 is a cross section through the complete display of the preferred embodiment of the invention.

Referring to FIG. 1, there is shown a printed circuit board (PCB) 10 having mounted thereon an array of LEDs 11, 12, 13. The PCB 10 has a top solder mask 14 which has a white surface. (NB a green surface is more usual).

Mounted over the PCB 10 is a liquid crystal display 15 comprising a front polarizer 16, a compensation cell 17, a display cell 18 and a back polarizer 19, including a reflector sheet. The LCD display 15 is separated from the PCB 10 by means of a silicone rubber zebra connector 20 which provides electrical connections between the board 10 and terminals of the display cell (the compensation cell has no terminals). A reflector 21 is provided inside the zebra connector. A bezel 22 covers the zebra 20 and the edges of the display 15, fixing the display in position.

The display is viewed from the top, at an angle between the perpendicular and the angle shown by the arrow labelled "viewing direction". The total viewing area of the display is the area within-the bezel 15 as marked.

A significant feature of the arrangement is the compensation cell 17 and the display cell 18. These are, in the preferred embodiment, double super twisted nematic cell, available from Optrex Europe GmbH of Sodener Strasse 9, W-6231 Schwalbach/Taunus., Germany. The area of the display is predominantly black and the characters appear transparent. Light transmission through the "open" LCD cell is reduced by at least 50% and preferably by about 80%— i.e. a back light source of 100 Cd/m$^2$ is reduced to 20 Cd/m$^2$ at the front (viewing side). The functional temperature range of the DSTN LCD cell is from −30° C. to +80° C. Critical to the high temperature is the attachment/gluing of the LCD polarizer, which affects the stability and lifetime of the display. Local heating up of the LCD glass also affects the temperature coefficient of the liquid material.

The LEDs 11, 12, 13 are mounted on the PCB 10 with a brilliant white surface 14 and are surrounded by a white plastic retainer 21 with slanted edges. The LCD cell terminals are connected to the PCB on two sides by the conducting zebra strips 20. These have the function of maintaining the spacing between the PCB surface and the display 15.

Figure 2:
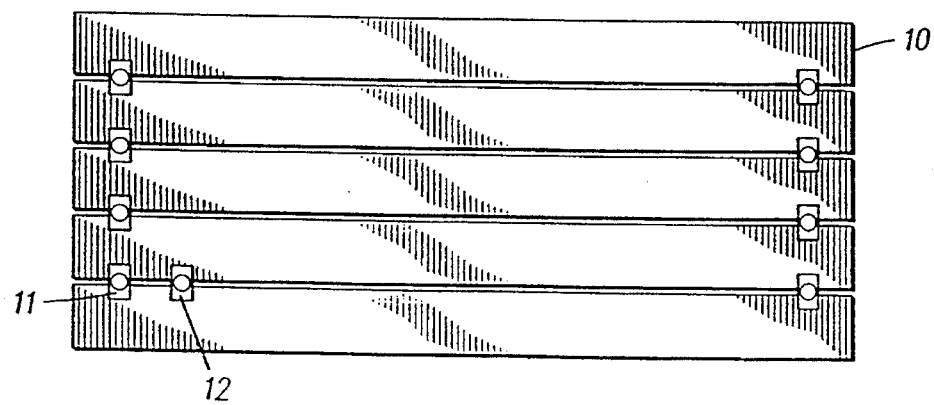
FIG. 2 is a view in the direction of the arrow X on FIG. 1.

The negative transmission DSTN LCD needs a constant, evenly dispersed and high intensity back light to emit light through the "open" transparent display areas. The light source is provided by the LEDs 11, 12, 13, which are also shown in FIG. 2. These LEDs have fifty-degree polar lighting angle for 100% intensity (35–40 mCd/m$^2$/20 mA). They have a spectral wave length of typically 570 nm (yellow-green) and each is mounted on a ceramic chip carrier substrate 0.7 mm above the mounting plane. Each LED has a rating of 50 mW and consumes 21 mW.

The LEDs are mounted on the surface of a multi-layer PCB. The next layer below is a solid ground plane which absorbs and distributes heat from the top layer. The arrangement provides very low thermal resistance.

It has been found that a distance between the lighting point and the liquid layer of the display element 18 (distance "A" in FIG. 1) of 6 mm can be achieved with uniform distribution of light across the display by using 100% overlapping of light from one LED to another, as shown in FIG. 1. This is achieved by having a maximum distance between the LEDs of about 7 mm. Note that this figure is derived from the formula:

$$B = A \tan \Theta$$

Using the dimensions given:

$$6 \tan 50 = 7.15 \text{ mm}.$$

With these dimensions, the light from one LED is completely overlapped by light from adjacent LEDs (at least in the direction of the rows and columns of the array of LEDs). This arrangement is reached empirically. Slightly wider spacing could be acceptable. Narrower spacing will increase the cost and increase the heat generation and power drain.

The slanting edges of the plastic retainer reflect light upwards through the display. The plastic retainer has a hole in each end for air circulation.

Figure 3:
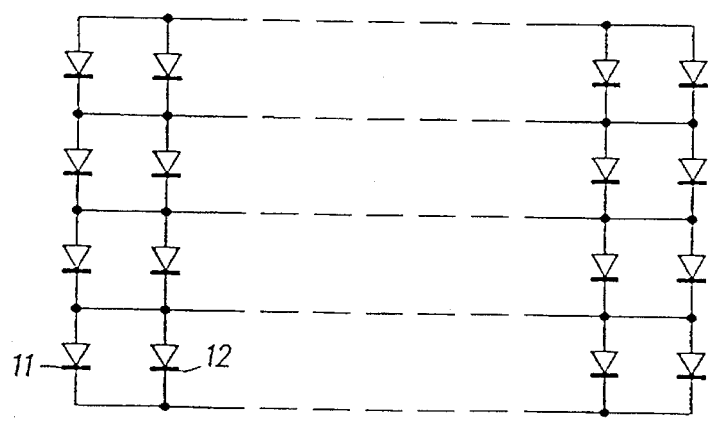
FIG. 3 is a circuit diagram of the electrical connections of the LEDs of FIG. 1.

FIG. 3 shows an electrical schematic diagram for the LED connections. It is seen that they are connected in parallel. This arrangement will distribute the supply current evenly. The voltage drop across the LED assembly is 8±1.4V—i.e. the total supply current is 125 mA for 1W power dissipation and the single LED current is 10.5 mA. To achieve an acceptable lifetime for the LED backlight (100,000 hours) the supply current is reduced to 10 mA at 60° C. and reduced linearly with temperature until it is switched off above 80° C.

It is found that no further light diffusion is necessary than takes place in the cell and the material of the back polarizer.

The light intensity has been increased by about 25% in comparison with the diffusion loss of standard LED backlight modules with constant LED current.

I claim:

1. A display comprising:

a semi-transparent display element;

a backlight sub-assembly; and mounting means mounting the display element over and directly adjacent to the backlight sub-assembly wherein the backlight sub-assembly comprises a two-dimensional array of light emitting diodes mounted on a circuit board, characterized in that:

there is no diffuser between the light emitting diodes and the display element, the light emitting diodes have a wide polar lighting angle, and the spacing between the light emitting diodes is determined by the polar lighting angle such that overlapping of light from one light emitting diode to another provides the display, when viewed from the front of the display element, with substantially evenly dispersed brightness across the array.

2. A display according to claim 1, wherein the display element has a layer of reflective material on the back side thereof, making it a transflective display element.

3. A display according to claim 1, wherein the display element comprises double super twisted nematic liquid crystal cell.

4. A display according to claim 1, wherein the display element is a negative transmissive or transflective mode liquid crystal assembly.

5. A display according to claim 1, wherein the display element is a transmissive or transflective mode liquid crystal assembly having a front polarizer, a back polarizer and a display cell element and a compensation cell element sandwiched between the front and back polarizers.

6. A display according to claim 5, wherein the display element has a layer of reflective material on the back side thereof, making it a transflective display element.

7. A display according to claim 5, wherein the display element comprises double super twisted nematic liquid crystal cell.

8. A display according to claim 5, wherein the display element has a layer of reflective material on the back side thereof, making it a transflective display element.

9. A display according to claim 5, wherein the display element is a negative transmissive or transflective mode liquid crystal assembly.

10. A display according to claim 9, wherein the display element has a layer of reflective material on the back side thereof, making it a transflective display element.

11. A display according to claim 9, wherein the display element comprises double super twisted nematic liquid crystal cell.

12. A display according to claim 11, wherein the display element has a layer of reflective material on the back side thereof, making it a transflective display element.

13. A display comprising:

a liquid crystal display element;

a backlight sub-assembly; and mounting means mounting the display element over and directly adjacent to the backlight sub-assembly, wherein the backlight sub-assembly comprises a two-dimensional array of light emitting diodes mounted on a circuit board, the circuit board and other surfaces behind and around the light emitting diodes forming a reflective surface, characterized in that:

the liquid crystal display element is of the double super twisted nematic type, there is no diffuser between the light emitting diodes and the display element, the light emitting diodes have a wide polar lighting angle, and the spacing between the light emitting diodes is determined by the polar lighting angle such that overlapping of light from one light emitting diode to another provides the display, when viewed from the front of the display element, with substantially evenly dispersed brightness across the array.

14. A display according to claim 13, wherein the light emitting diodes are surface-mounted on the circuit board.

15. A display according to claim 13, comprising temperature measuring means, supply current means and means for controlling the supply current to the backlight sub-assembly to reduce the current when the temperature exceeds a threshold.

16. A display according to claim 13, wherein holes are provided in the mounting means for circulation of air.

17. A display according to claim 16, wherein the light emitting diodes are surface-mounted on the circuit board.

18. A display according to claim 16, comprising temperature measuring means, supply current means and means for controlling the supply current to the backlight sub-assembly to reduce the current when the temperature exceeds a threshold.

19. A display according to claim 18, wherein the light emitting diodes are surface-mounted on the circuit board.

* * * * *